Oct. 4, 1966 H. T. NIELSEN ETAL 3,276,261
THERMOSTATIC REGULATOR FOR VALVES
Filed July 6, 1964
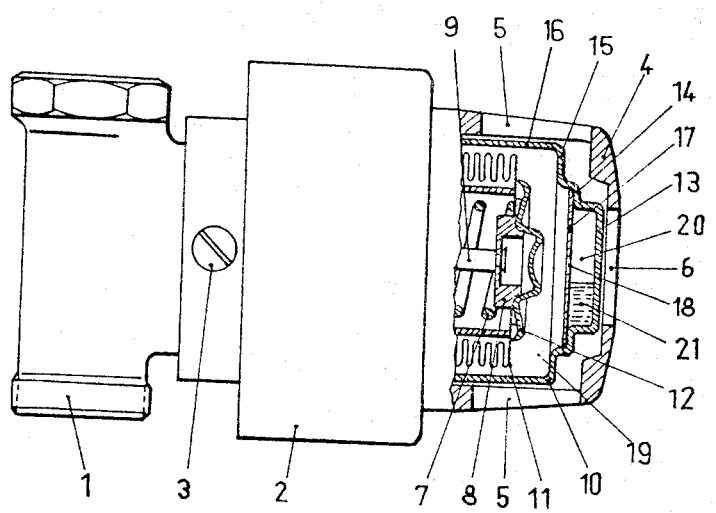

United States Patent Office 3,276,261
Patented Oct. 4, 1966

3,276,261
THERMOSTATIC REGULATOR FOR VALVES
Helmar Trøst Nielsen, Nordborg, and Knud Aage Hansen, Sonderborg, Denmark, assignors to Danfoss A/S, Nordborg, Denmark, a corporation of Denmark
Filed July 6, 1964, Ser. No. 380,467
Claims priority, application Germany, July 6, 1963, D 41,920
1 Claim. (Cl. 73—368.7)

This invention relates generally to thermostatically controlled valves and more particularly to a thermostatically controlled valve regulator.

In the known thermostatically operated or controlled valves in which the thermostatic regulator is vapor-pressure-operated and comprises sensing means for sensing ambient or room temperature to be controlled which comprises a wall or surface of the operator or thermostatic regulator of the valve, the general contruction is such that when the regulator is in operation the sensing fluid condensate goes to the bottom of the regulator if it is mounted vertically. In this case the sensing fluid condensate will be vaporized by the bellows system and related parts which are in close contact with the valve housing or body through which a hot medium being controlled flows. The vapor pressure and therefore control in the regulator is then more a function of the temperature of the bellows system than that of the sensing means, such as a sensing plate, of the regulator. Substantially the same thing will occur if the regulator is mounted horizontally.

It is a principal object of the present invention to provide a new and improved thermostatic regulator for thermostatically operated valves capable of accurately regulating ambient of room temperature whether the regulator is mounted horizontally or vertically.

Another object is to provide a new and improved thermostatic valve obviating the deficiencies of known regulators incorporating therein ambient temperature sensing means.

A feature of the thermostatic regulator according to the invention is the provision of a thermostatic operator in which a sensing wall or surface is mounted perpendicular to the longitudinal axis of the regulator and faultless operation is obtained. This is accomplished by providing the sensing fluid-containing portion of the regulator with a dividing wall in which a separate chamber is defined in the regulator in which the kinetics of the regulatory or sensing fluid or gas-liquid is accurately controlled by providing an area or space by which the vapor pressure of the sensing fluid is accurately maintained as a function of the ambient or room temperature being sensed.

The thermostatic regulator according to the invention is provided with an annular dividing wall defining one end of a vapor-containing space of larger volumetric dimension than a second chamber in communication therewith through an opening in the annular dividing wall and in which a sensing fluid is contained and the vapor thereof is converted to a liquid or condensate in dependence upon the ambient or room temperature being sensed by the regulator. Thus the vapor pressure, and therefore the actuating-pressure of the pressure-responsive elements in the regulator is accordingly principally a direct function of the ambient or room temperature.

Another feature of the invention is the provision of the separation wall in the sensing fluid compartments of the regulator such that the chamber or compartment by which vapor pressure is controlled principally as a function of ambient temperature being sensed is smaller than the other compartment, which contains only vapor, of the regulator and is capable of containing all of the sensing liquid at the lowest working temperature.

Provision is made in the regulator and valve according to the invention for initially and adjustably setting a control spring the pressure of which must be opposed for actuating the valve under control of the vapor pressure which depends directly on the room temperature being sensed.

Other features and advantages of the thermostatic regulator and thermostatically controlled valve in accordance with the present invention will be better understood as described in the following specification and appended claim in conjunction with the drawing in which an elevation view partly in section of a valve according to the invention is illustrated.

According to the drawing a thermostatically controlled valve provided with a regulator in accordance with the invention comprises a valve body 1 on which is mounted a thermostatic operator or regulator 2 suitably removably mounted on the valve body 1, for example by screws 3. It being understood, that the regulator could be mounted in a removable condition, for example by complementary threads on the valve body and the regulator.

The regulator is provided with a manually operated rotatable round actuating member or handle portion 4 and provides a rotatable regulator housing having a sidewall opening 5 and a central opening 6. The valve body 1 is provided with a conventional seat and valve member, not shown, operable to a seated and an unseated position. A spring 7 bears against an annular plate 8 to which is fixed a valve stem 9 for actuating the valve member to a seated and unseated position. The spring is, for example, adjusted by the rotatable housing through suitable connection means therewith in known manner, for example a travelling lower abutment for the spring operably driven by means 4 and not shown, which are not a part of the invention. The spring is compressed and its force opposed by the regulator in actuating the valve as later described.

The valve regulator 2 is provided with a heat conductive inner housing 10 internally of which is mounted pressure-responsive actuator means comprising a bellows having a closed free end 11 on which bears and is seated a member 12 which seats on the annular plate 8 biased, for example, in a direction toward the right by the spring 7.

The housing 10 is provided with an endmost substantially flat end wall portion 13 which is substantially normal to the longitudinal axis of the regulator corresponding, for example, with the longitudinal axis of the valve stem 9. This wall portion functions as the primary sensing means of the regulator for sensing ambient or room temperature as hereinafter described. The housing is stepped as illustrated with an annular portion of reduced diameter 14 connected to an annular inwardly extending anular portion 15 integral with the sidewalls 16 of the housing for the actuator. The housing 10 may, for example, be constructed as circular in cross section. The stepped structure provides a shoulder to which is secured an annular partition 17 having a central opening 18 so that the interior of the housing is defined into two separate chambers or compartments 19 and 20. The chamber or compartment 19 is substantially vapor-filled in operation and is larger than the chamber 20 as illustrated in the drawings. The chamber 20 is sufficiently large that it can receive and contain the total volume of actuating or sensing fluid in the liquid state, at the lowest operating temperature thereof, in the regulator.

Upon installation of the regulator on a valve according to the invention the heating medium, for example steam or hot water, to be regulated passes through the valve body 1 and heat is transferred through the intimate connections established with the regulator 2 so that the regulator housing 10 receives heat and the compartment or chamber 19 is heated sufficiently that vapor is given off by any of the sensing fluid that may be therein and it enters the chamber 20 through the central opening 18, where it condenses when it comes into contact with the cooler wall 13. The condensate cannot leave the space 20 because of the partition 17 and within a very short period of operation all the condensate or liquid is transferred to the compartment 20. Thus in operation the chamber or compartment 19 is filled with vapor only and condensed vapor only appears in space 20.

It will be understood that the wall 13 is a major wall surface defining the chamber 20 and is relatively cooler than the remaining portions of the housing so that vapor entering chamber 20 will be condensed in dependence upon the ambient or room temperature being sensed by the housing surface 13. Thus, the larger the amount of condensate or condensed vapor formed in the chamber 20 the greater the vapor pressure will be affected in the space 19 in which the vapor-pressure-responsive part of the system is located. As the room temperature rises, a lesser amount of vapor will condense in the smaller space or chamber 20 that the vapor-pressure will change accordingly.

The space 20 must be sufficiently large so that it can contain the entire volume of the sensing and actuating liquid at the lowest working possible temperature of the valve and the volume of liquid must be sufficiently larger so that at maximum operating temperatures at least some liquid will remain in the space 20.

Those skilled in the art will understood that in order to control the vapor pressure substantially or principally as a function of the ambient or room temperature the vapor being controlled in the larger space 19 is kept out of contact with the main body of liquid. The vapor and condensate in the space 20 cannot accurately effect accurate control if the kinetics or vapor pressure control is established with the main body of vapor in the space 19 in immediate contact with the liquid. Thus according the invention the separation wall allows the kinetics within the chamber 20 to be established principally as a function of the temperature sensed by the surface 13 and thus the controlling vapor pressure is substantially a function of the room temperature sensed.

Those skilled in the art will understand that the housing can be constructed other than circular in cross section. Moreover, while the regulator described relates to a regulator mountable in horizontal position when installed the invention is equally applicable to regulators mounted vertically when in use. In the vertically installed regulators the principles of the invention are applied by installing an axially extending tube circumferentially of the opening 18. The tube, not shown, extends into the compartment 20 and terminates axially spaced from the inner surface of the end wall or plate 13. In this manner the condensate can be retained in the space 20 during operation with the regulators mounted upright or vertically.

Those skilled in the art will further understand that the sensing liquid in regulators according to the invention will actually be in both compartments 19 and 20 before installation and use since the regulator during transportation before being installed will be positioned in many different positions. Once installed and in operation the regulators according to the invention function as above described.

While a preferred embodiment of the invention has been shown and described, it will be understood that many modifications and changes can be made within the true spirit and scope of the invention.

What we claim and desire to secure by Letters Patent is:

For use on a thermostatically operated and controlled valve a thermostatic regulator comprising, means on said regulator adapted for mounting said regulator on said valve to be thermostatically controlled for automatically controlling flow of a heating medium through said valve, means in said regulator defining a first compartment containing a vapor for sensing in operation the temperature of said valve and having a vapor pressure varying in response to variations of temperature of said valve in dependence upon the flow of said medium therethrough, means comprising a partition in said regulator defining a smaller second compartment and having an opening providing communication with the first compartment receiving vapor from said first compartment and containing condensate of said vapor, the second compartment being dimensioned so that the condensate of said vapor only partially fills said second compartment, a major wall portion of said smaller compartment disposed sensing the ambient temperature in the vicinity of said regulator heating said condensate to control the vapor pressure in said regulator principally as a function of said ambient temperature, said major wall portion being cooler than the means defining the first-mentioned compartment, and actuator means in said regulator responsive to the vapor pressure in said regulator adapted for actuating said valve in dependence upon said vapor pressure, said means defining the first mentioned compartment comprising a tubular housing for said actuator means, said housing comprising a portion having a reduced transverse dimension and a portion having a major transverse dimension, means defining a shoulder between said portions, and said partition defining said second compartment being disposed seated on said shoulder in a fluid-tight condition.

References Cited by the Examiner
UNITED STATES PATENTS

| | | | |
|---|---|---|---|
| 1,875,387 | 9/1932 | Mackintosh | 236—42 |
| 1,916,814 | 7/1933 | Shivers | 236—42 |
| 1,920,896 | 8/1933 | Shivers | 236—42 |
| 2,040,743 | 5/1936 | Hubbard | 236—68 |

FOREIGN PATENTS 1,094,543  10/1959  Germany.

ALDEN D. STEWART, *Primary Examiner.*